Nov. 10, 1925.
A. STIMSON
1,561,194
ANTITHEFT DEVICE FOR AUTOMOBILES
Filed April 2, 1925
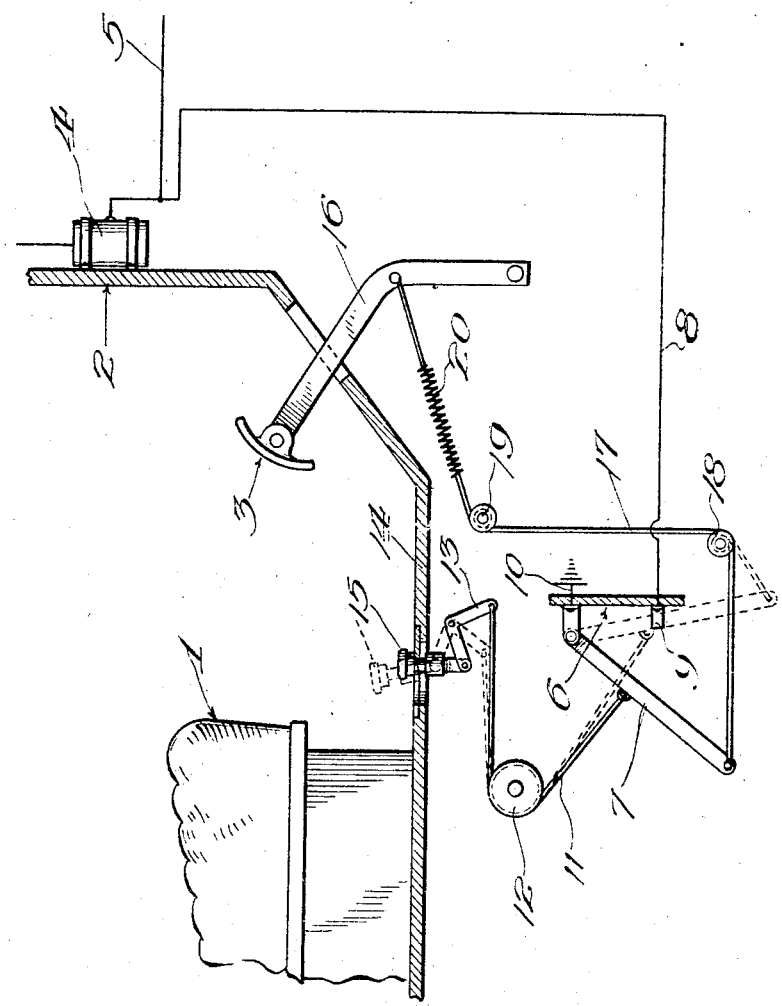
Inventor:
Arthur Stimson Patented Nov. 10, 1925.

1,561,194

UNITED STATES PATENT OFFICE.

ARTHUR STIMSON, OF CHICAGO, ILLINOIS, ASSIGNOR OF ONE-HALF TO J. A. RISHER, OF CHICAGO, ILLINOIS.

ANTITHEFT DEVICE FOR AUTOMOBILES.

Application filed April 2, 1925. Serial No. 20,283.

*To all whom it may concern:*

Be it known that I, ARTHUR STIMSON, a citizen of the United States, residing at Chicago, in the county of Cook and State of Illinois, have invented certain new and useful Improvements in Antitheft Devices for Automobiles, of which the following is a specification.

This invention has to do with improvements in devices for preventing the theft of automobiles and the like. It has to do particularly with improvements in ignition circuits whereby it is possible for the driver to throw the machine out of commission very quickly and without attracting particular attention during the act.

The main object of the invention is to interconnect the circuit and brake systems in such a way that when the invention is in use, the ignition circuit will be interrupted the first time the brake is used thereafter. Nevertheless the ignition circuit will not be interrupted until the brake is used after adjusting the anti-theft device itself.

The purpose sought to be accomplished by this arrangement is that when the car is held up by a robber and the driver is compelled to vacate it, he is at the mercy of the driver until the car has been driven away a sufficient distance to enable the owner to seek help or protect himself. In the meantime the robber will have driven the car some distance before using the brake system, but the first time that the brake system is used, he will complete the disarrangement of the ignition circuit and make it impossible for him to thereafter drive the car without again restoring the parts to normal position.

Other objects and uses of the invention will appear from a detailed description of the same which consists in the features of construction and combinations of parts hereinafter described and claimed.

In the drawing, the figure shows more or less diagrammatically the front portion of an automobile having the features of the present invention applied to its ignition and brake system.

The driver's seat is designated by the numeral 1, the dash board by the numeral 2, and the brake pedal by the numeral 3. The ignition coil is also shown on the front side of the dash board 2 by the numeral 4. It is deemed unnecessary to illustrate either the brake or ignition systems in detail, but the high tension line going to the distributor or to the spark plug is shown at 5.

According to the present invention, I place a switch shown at 6 at a convenient point, preferably beneath the floor board, and interconnect the same in such a way that normally this switch does not in any manner interfere with the ignition system. The switch is normally in the open circuit condition as shown by the full line position of its blade 7. It may, however, be drawn over to the dotted line position wherein the high tension lead 5 is grounded by the connection 8 leading to the switch contact 9, and the ground connection 10 leading from the switch blade 7.

Ordinarily the switch blade 7 is held in the open circuit position shown by full lines, by means of a cord 11 passing over a pulley 12 to a bell crank 13 beneath the floor board 14. A suitable button 15 extends through the floor board and is connected to the bell crank so that upon releasing said button into the dotted line position the bell crank may swing up and allow the knife blade to fall. The device is so arranged that the friction of the parts will prevent the knife blade from falling of its own weight, even after the button 15 has been released. I then provide a connection from the brake lever 16 to the knife blade so that when the brake lever is first manipulated after the button 15 has been released, the knife blade will be drawn over to the closed circuit dotted line position. For this purpose, I provide a cord 17 reaching over pulleys 18 and 19 and extending from the brake lever to the knife blade.

In order to allow the brake lever to be used in ordinary service, even when the button 15 is depressed, as shown by full lines, I provide a spring 20 in the cord 17, but this spring is so arranged that it exercises no pull on the cord 17 even when the button 15 is released, until the brake lever itself is forced over to set the brake.

It will thus be evident that I have provided an arrangement whereby the brake may be used in ordinary service without any interference with its normal operation, and whereby the releasing of the button 15 does not in itself interrupt the proper functioning of the ignition circuit, but whereby, after the button has been released, the circuit will be interrupted the next time the brake is operated.

While I have herein shown and described only certain embodiments of the features of my present invention, still I do not intend to limit the same except as I may do so in the claims.

I claim:

1. The combination with the high tension side of an automobile ignition circuit and the brake lever thereof, of a grounding switch, means normally holding the same in open circuit position but releasable at the will of the driver, and a connection from the high tension side of the ignition circuit to the grounding switch, an operative connection from the grounding switch to the brake lever tending to close said switch when the lever is operated to set the brake, and a yieldable element in said connection, substantially as described.

2. The combination with the high tension side of the ignition circuit of an automobile and the brake lever thereof, of a grounding switch, means normally holding the same in open circuit position but releasable at the option of the driver, a connection from the high tension side of the circuit to the switch, and a yieldable connection between the switch and brake lever operable to close the switch when the lever is manipulated with the aforesaid means released, substantially as described.

3. The combination with the ignition circuit of an automobile or the like and the brake rigging thereof, of a grounding switch, a connection from the ignition circuit thereto, means normally holding the grounding switch in open circuit position but releasable at the option of the driver, and a yieldable connection between the switch and the brake rigging operable to close the switch when the rigging is manipulated to set the brake, the aforesaid means being released, substantially as described.

ARTHUR STIMSON.